United States Patent [19]
Phillippi

[11] 3,977,440
[45] Aug. 31, 1976

[54] COMPOSITE BRAKE HOSE

[75] Inventor: Larry R. Phillippi, Mantua, Ohio

[73] Assignee: Samuel Moore and Company, Mantua, Ohio

[22] Filed: May 3, 1972

[21] Appl. No.: 249,927

[52] U.S. Cl. .............................. 138/125; 138/130
[51] Int. Cl.² ........................................ F16L 11/08
[58] Field of Search ............ 138/125, 137, 174, 130

[56] References Cited
UNITED STATES PATENTS

| | | | |
|---|---|---|---|
| 2,151,307 | 3/1939 | Smith.................................. | 138/133 |
| 2,888,954 | 6/1959 | Gates................................... | 138/137 |
| 3,242,691 | 3/1966 | Robinson et al................ | 138/130 X |
| 3,245,431 | 4/1966 | Coe..................................... | 138/125 |

FOREIGN PATENTS OR APPLICATIONS 1,127,863   9/1968   United Kingdom................. 138/125

*Primary Examiner*—Jerry W. Myracle
*Attorney, Agent, or Firm*—Clelle W. Upchurch

[57] ABSTRACT

A self-retracting flexible composite hose of helical configuration has a core tube and sheath of crystal-line-like polymer which has an elastic memory, a layer of helically wound spaced strands of fibrous reinforcing material which only partially covers the core tube and polymeric protuberances integral with the sheath extending between the strands and fusion welded to the core tube.

6 Claims, 4 Drawing Figures

COMPOSITE BRAKE HOSE

This invention relates generally to a composite hose and more particularly to a self-retracting composite hose adapted for transmission of fluids under pressure.

A self-recoilable composite tubing is disclosed in U.S. Pat. No. 3,245,431. The disclosed tubing has a core tube formed of a crystalline-like polymeric material, a fibrous reinforcing sleeve member comprising a plurality of strands disposed about the core tube which provide close to 100% coverage of the surface of the core tube, and an extruded outer sheath of crystalline-like polymer. The core tube, reinforcing sleeve and sheath are able to slip with respect to one another. The tubing disclosed in U.S. Pat. No. 3,245,431 can be used to advantage in many applications which involve transfer of fluids under pressure but has the disadvantage that its wall thickness may be too thick for some applications where tubing of small diameter is required. The sheath of such tubing particularly in small diameters has a tendency to wrinkle and the tubing may kink if it is bent sharply. Moreover, its impact resistance at cold temperatures is sometimes not great enough for some applications.

It is therefore an object of this invention to provide a recoilable composite tube or hose having a relatively thin wall thickness and an improved resistance to impact at cold temperatures. Another object of the invention is to provide a self-retracting composite hose which may have a small outside diameter and is substantially wrinkle resistant and adapted to be bent sharply without kinking. A more specific object of the invention is to provide a relatively small diameter self-storing composite tube adapted to conduct fluids under pressure which is substantially wrinkle resistant, may be bent sharply without kinking and is resistant to damage from impact at low temperatures. Still a further object of the invention is to provide a recoilable hose for the air brake system of a tractor-trailer vehicle.

Other objects of the invention will become apparent from the following description with references to the accompanying drawing wherein FIG. 1 is an elevation of one embodiment of the invention suitable for installation in the air brake system of a truck or tractor-trailer unit;

The foregoing objects and others are accomplished in accordance with this invention, generally speaking, by providing a composite hose having an extruded core tube of crystalline polymeric material, an extruded abrasion resistant sheath and an intermediate single layer of open mesh fibrous reinforcing material formed by overlapping, oppositely helically wound spaced strands. The polymer of the sheath projects through the windows of the open mesh fibrous layer and is fusion welded to the underlying surface of the core tube. The strands of fibrous material cover only from about 15% to about 55% of the external surface of the core tube. Preferably the strands cover only from about 25% to about 45% of the surface of the core tube. The fibrous layer should have a melting point such that it will not fuse as the sheath is extruded thereover.

Figure 1:
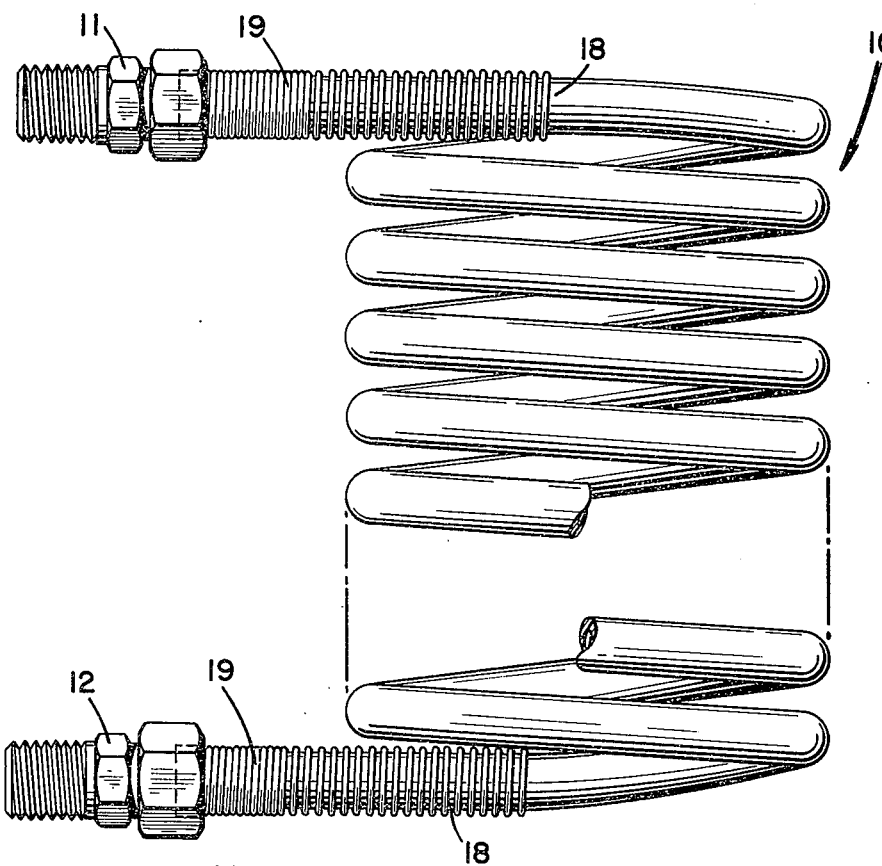

Referring now to FIG. 1 of the drawing, a recoilable composite hose 10 is secured at its ends to suitable metal fittings 11 and 12 for attaching the hose 10 between a source of fluid under pressure such as a compressed air tank carried by the tractor of a tractor-trailer vehicle and a pneumatically actuated device such as the air brake system of the vehicle.

Figure 2:
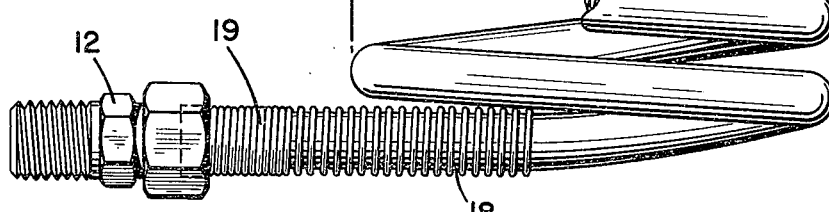
FIG. 2 is a partial cut-away elevation of a composite hose provided by the invention.
Figure 2:
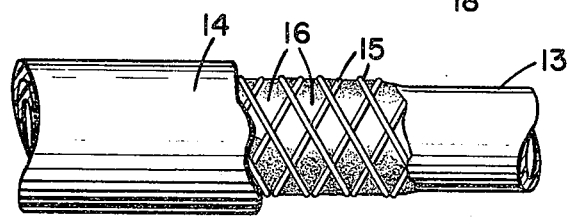
Figure 3:
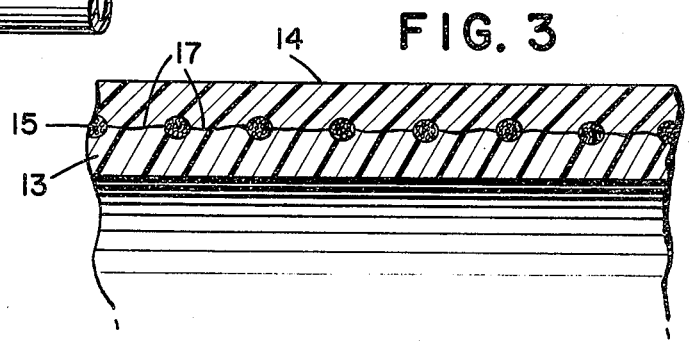
FIG. 3 is a fragmentary longitudinal section of the hose of FIG. 2.

As illustrated best in FIGS. 2 and 3, recoilable hose 10 has a crystalline thermoplastic resinous core tube 13, an abrasion resistant covering sheath 14 and an intermediate fibrous reinforcing layer 15 composed essentially of oppositely helically wound spaced strands of resinous filaments having a melting point above the temperature of the polymer of the sheath as it is extruded over the fibrous layer 15 to form sheath 14. The helically wound strands of layer 15 cover from about 15% to about 55% of the surface of core tube 13. Stated another way, from about 45% to about 85% of the external surface of core tube 13 is not covered by the fibrous strands 15.

The polymer used for sheath 14 flows through the openings 16 between the strands of fibrous layer 15 and forms spaced protuberances 17 which are welded to core tube 13 and are integral with sheath 14 bonding the two together and preventing slip between any of the three components 13, 14 and 15 of the hose.

The composite hose 10 has a relatively thin walled core tube 13, only a single layer of fibrous material (i.e. only one layer of strands helically wound in each direction) and a relatively thin sheath. Because the sheath and the core are bonded together by polymer filling the windows 16 between the strands, the hose acts as a unit and can be provided in relative small diameters for transmission of fluids under pressure.

In a preferred embodiment of the invention, the core tube and sheath are nylon and the fibrous layer is composed of strands of "Dacron" filaments. Nylon is a polyamide. Dacron is a poly(ethylene) terephthalate polyester fiber. The melting point of "Dacron" is above the fusion point of nylon. The fibrous material may be Dacron, nylon or any other material provided it is not exposed to a temperature long enough during sheathing to fuse the fibrous material. The core tube and sheath may also be formed from any other suitable at least partially crystalline synthetic resinous material which has an elastic memory such as, for example, high density polyethylene, polycarbonate or a polyacetal such as "Delrin" manufactured by E. I. duPont de Nemours & Company, Inc. The core tube and sheath may be of the same polymer composition or different. A polyester elastomer such as, "Hytrel" manufactured by E. I. duPont de Nemours & Company, Inc. may also be used for the core tube, the sheath or both. Hytrel is semi-crystalline and a fully polymerized, high molecular weight, chemically stable, thermoplastic polyester elastomer composed of alternate amorphous and crystalline chains.

Figure 4:
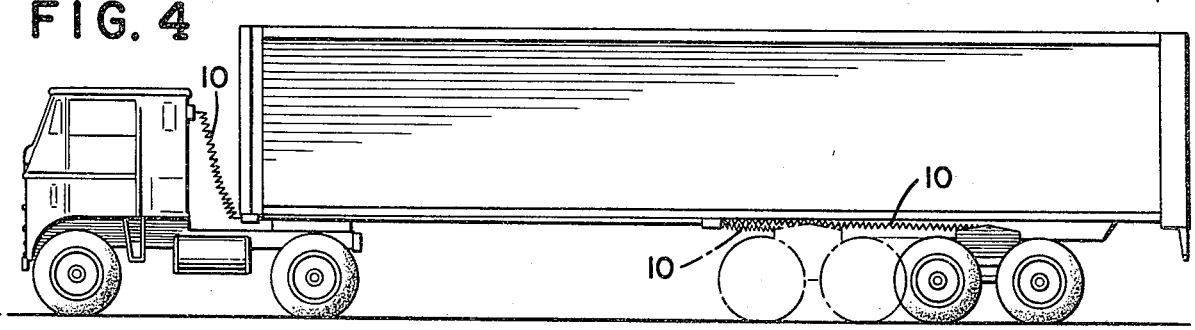
FIG. 4 is a diagrammatic side elevation of a tractor-trailer provided with an embodiment of the invention as parts of its air brake system.

The composite hose provided by this invention has been found particularly advantageous for replacing the rubber hose heretofore used in the air brake system of tractor-trailer vehicles. As shown in FIG. 4, the retractable hose 10 may be used to connect a compressed air tank carried by the tractor with the air-line of the braking system of a trailer. It may also be used to advantage for connecting the brakes on the wheels of the trailer to the frame mounted air brake tubing. On some trailers, the wheels and axles are moveable to shorten or lengthen the wheel base of a tractor-trailer unit as illustrated in FIG. 4. Heretofore, rubber hose used below the trailer body would be permitted to dangle at short wheel bases so that sufficient length would be available for longer wheel bases. The self retractable hose provided by this invention will not dangle even when the shortest wheel base is being used.

Preferably, the core tube is dyed a color which is different from the color of the sheath or the reinforcing layer in order that any break in the sheath and fibrous layer can be detected by visual inspection. In this way damaged hose can be easily detected and replaced before it ruptures under pressure and renders the braking system inoperable.

As indicated hereinbefore the elastic memory of the core tube and sheath should be such that the hose is self-retractable as a unit. The recoilable hose may be formed after the sheath has been applied by helically winding the hose about a mandrel, heating the wound hose, cooling and then unwinding it. Preferably, the hose is helically wound about the mandrel with adjacent convolutions disposed in axially spaced relation in order that a length of the resulting tubing may be compressed or extended from its normal at rest condition. The hose having a nylon core and sheath may be set in helical form by heating it in air or liquid to its setting temperature which may be from about 200° to about 300°F. or higher for from 5 to 90 minutes. Comparable temperatures and times may be used for hose having a core tube and/or sheath of different resinous composition. The tube is then cooled below the setting temperature and because of its elastic memory will retain its helical form. Of course, any other suitable "setting" operation may be used.

It is to be noted that each end of the coiled tube is preferably provided with a substantially straight or uncoiled segment 18. This straight segment may be an unbent continuation of the last convolution extending outwardly from the coil in a plane parallel with the axis of the coil or it may be bent to either side or above or below the last convolution of the coil at an angle with the axis thereof. The segment which is to be straight may be held straight during the setting period. Segment 18 may be reinforced with a helically wound wire 19.

Although the invention has been described in detail for the purpose of illustration, it is to be understood that such detail is solely for that purpose and that variations can be made by those skilled in the art without departing from the spirit and scope of the invention except as it may be limited by the claims.

The embodiments of the invention in which an exclusive property or privilege is claimed are defined as follows:

1. A flexible hose connecting the brake system of a vehicle with a source of air under pressure carried by the vehicle wherein the length of the hose between the braking system and the source of air under pressure must vary in length with variations in the distance between the said source of air under pressure and the braking system, said hose having substantially straight segments at each end thereof, a fitting on one end of the hose for attaching the hose to the brake system and on the opposite end of the hose for connecting the hose to the source of air under pressure, said hose being coiled into a helical configuration which is expandable by separation of the coils and self-retracting from its expanded configuration into its coiled configuration in response to the removal of restraint, said hose comprising a core tube of crystalline-like polymeric material, a sheath of crystalline-like polymeric material, and an intermediate layer reinforcing the core tube formed of continuous strands of fibrous material helically wound in opposite directions about the core tube with adjacent convolutions of each strand in spaced relationship with each other to form open spaces therebetween, said sheath being fuse bonded to the core tube through said open spaces to form a tube wall of components locked together against relative movement.

2. The hose of claim 1 wherein the core tube and sheath are nylon and the fibrous strands are poly(ethylene) terephthalate polyester.

3. The hose of claim 1 wherein the core tube, sheath and said strands are nylon.

4. The hose of claim 1 wherein the core tube is a polyester elastomer.

5. The hose of claim 1 wherein the sheath is a polyester elastomer.

6. The hose of claim 1 wherein both the core tube and sheath are polyester elastomers.

* * * * *

Disclaimer

3,977,440.—*Larry R. Phillippi*, Mantua, Ohio. COMPOSITE BRAKE HOSE. Patent dated Aug. 31, 1976. Disclaimer filed Aug. 6, 1979, by the assignee, *Eaton Corporation*.

Hereby enters this disclaimer to claims 2 and 3 of said patent.

[*Official Gazette October 28, 1980.*]